(12) United States Patent
Freeman et al.

(10) Patent No.: US 12,233,941 B2
(45) Date of Patent: Feb. 25, 2025

(54) BODY STRUCTURE FOR VEHICLE HAVING REINFORCEMENT MEMBER

(71) Applicant: Ford Global Technologies, LLC, Dearborn, MI (US)

(72) Inventors: Michael James Freeman, Allen Park, MI (US); Joseph Prescott Hickey, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 17/871,736

(22) Filed: Jul. 22, 2022

(65) Prior Publication Data

US 2024/0025483 A1    Jan. 25, 2024

(51) Int. Cl.
*B62D 25/04* (2006.01)
*B62D 21/15* (2006.01)
*B62D 27/02* (2006.01)

(52) U.S. Cl.
CPC ............ *B62D 25/04* (2013.01); *B62D 21/15* (2013.01); *B62D 27/023* (2013.01)

(58) Field of Classification Search
CPC ........ B62D 25/04; B62D 25/06; B62D 21/15; B62D 21/147; B62D 27/023

USPC .......................... 296/193.06, 29, 30, 187.12
See application file for complete search history.

(56) References Cited

U.S. PATENT DOCUMENTS

| | | | |
|---|---|---|---|
| 8,894,133 B2 | 11/2014 | Chai | |
| 9,815,498 B2 * | 11/2017 | Yamamoto | B62D 29/002 |
| 10,751,800 B2 | 8/2020 | TenHouten et al. | |
| 10,948,000 B2 * | 3/2021 | Tyan | B32B 15/10 |
| 2021/0309298 A1 | 10/2021 | Song | |
| 2022/0111906 A1 | 4/2022 | Freeman | |

FOREIGN PATENT DOCUMENTS

AU    2019202652 B2 *  1/2024  ........... B29C 70/021

* cited by examiner

*Primary Examiner* — Dennis H Pedder
(74) *Attorney, Agent, or Firm* — Burris Law, PLLC

(57) ABSTRACT

A vehicle body structure includes a vehicle pillar and a unitized reinforcement member. The vehicle pillar includes an inner panel and an outer panel secured to the inner panel to form an internal cavity. The unitized reinforcement member is disposed within the internal cavity of the vehicle pillar and extends along a longitudinal direction of the vehicle pillar. The unitized reinforcement member includes an inner panel portion spaced apart from the inner panel, an outer panel portion coupled to an inner surface of the outer panel, and a connecting portion connecting the inner panel portion and the outer panel portion.

20 Claims, 6 Drawing Sheets

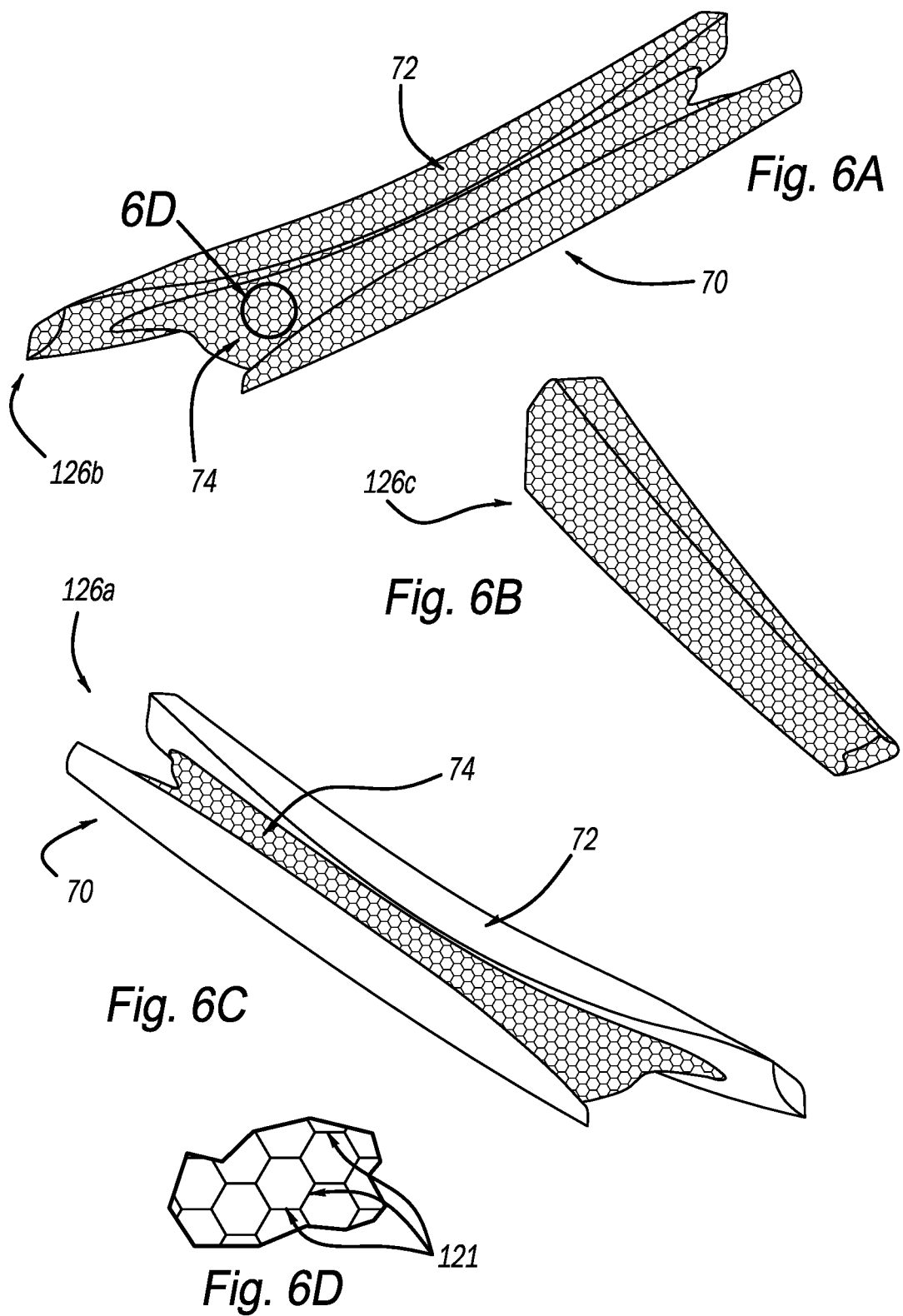

BODY STRUCTURE FOR VEHICLE HAVING REINFORCEMENT MEMBER

FIELD

The present disclosure relates to a body structure for a vehicle having a reinforcement member and a vehicle including a body structure having a reinforcement member.

BACKGROUND

The statements in this section merely provide background information related to the present disclosure and may not constitute prior art.

Vehicles such as sport utility vehicles, for example, include both a front door and a rear door on the same side of the vehicle, and are designed to carry multiple occupants. Such vehicles also include vehicle pillars (e.g., A pillars, B pillars, and C pillars) that frame the doors and support a roof of the vehicle. Some vehicles include pillar reinforcements that are associated with the vehicle pillars and add further structural integrity to the vehicle. The present disclosure addresses potential challenges regarding conventional reinforcements.

SUMMARY

This section provides a general summary of the disclosure and is not a comprehensive disclosure of its full scope or all of its features.

In one form, the present disclosure provides a vehicle body structure including a vehicle pillar and a first unitized reinforcement member. The vehicle pillar includes an inner panel and an outer panel secured to the inner panel to form an internal cavity. The first unitized reinforcement member is disposed within the internal cavity of the vehicle pillar and extends along a longitudinal direction of the vehicle pillar. The first unitized reinforcement member includes an inner panel portion spaced apart from the inner panel, an outer panel portion coupled to an inner surface of the outer panel, and a connecting portion connecting the inner panel portion and the outer panel portion.

In variations of the vehicle body structure of the above paragraph, which may be implemented individually or in combination: the inner panel includes a first body and a first pair of flanges extending from the first body and the outer panel includes a second body and a second pair of flanges extending from the second body and fixed to the first pair of flanges, the first unitized reinforcement member fixed to the second body; the first unitized reinforcement member is spaced apart from the first body; the vehicle pillar is an A-pillar; the first unitized reinforcement member extends substantially an entire length of the vehicle pillar; the inner panel portion, the outer panel portion, and the connecting portion comprise a lattice structure; a second unitized reinforcement member is fixed to and disposed outboard of the vehicle pillar; the second unitized reinforcement member extends along a longitudinal direction of the vehicle pillar; the second unitized reinforcement member includes a lattice structure formed; a body outer member is secured to the outer panel of the vehicle pillar, the second unitized reinforcement member being disposed between the body outer member and the vehicle pillar; the second unitized reinforcement member is spaced apart from the body outer member; and a hinge pillar, and a B-pillar connected to the hinge pillar by the vehicle pillar, the first unitized reinforcement member is located closer towards the B-pillar than the hinge pillar.

In another form, the present disclosure provides a vehicle body structure including a vehicle pillar and a plurality of unitized reinforcement members. The vehicle pillar includes an inner panel and an outer panel secured to the inner panel to form an internal cavity. The unitized reinforcement members are secured to the vehicle pillar and extend along a longitudinal direction of the vehicle pillar. A first unitized reinforcement member of the unitized reinforcement members is disposed within the internal cavity and a second unitized reinforcement member of the unitized reinforcement members is disposed outboard of the vehicle pillar. Each of the unitized reinforcement members includes a portion having a lattice structure.

In variations of the vehicle body structure of the above paragraph, which may be implemented individually or in combination: a body outer member is secured to the outer panel of the vehicle pillar, the second unitized reinforcement member being disposed between the body outer member and the vehicle pillar; and the first unitized reinforcement member is spaced apart from the inner panel and the second unitized reinforcement member is spaced apart from the body outer member.

In yet another form, a method includes directly depositing a material onto a vehicle pillar using additive-manufacturing to build local reinforcement members onto the vehicle pillar, each reinforcement member includes an inner panel portion located proximate an inner panel of the vehicle pillar, an outer panel portion located proximate an outer panel of the vehicle pillar, and a connecting portion connecting the inner panel portion and the outer panel portion, the connecting portion of the reinforcement members includes a lattice structure.

In variations of the vehicle body structure of the above paragraph, which may be implemented individually or in combination: the vehicle pillar is an A-pillar; and a first reinforcement member of the reinforcement members is located within an internal cavity of the vehicle pillar and a second reinforcement member of the reinforcement members is located external to the internal cavity of the vehicle pillar.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6A-6C are perspective views of alternate reinforcement members that can be incorporated into the vehicle body structure of FIG. 1; and FIG. 6D is a close-up view of a portion of the lattice structure of FIG. 6A.

Figure 1:
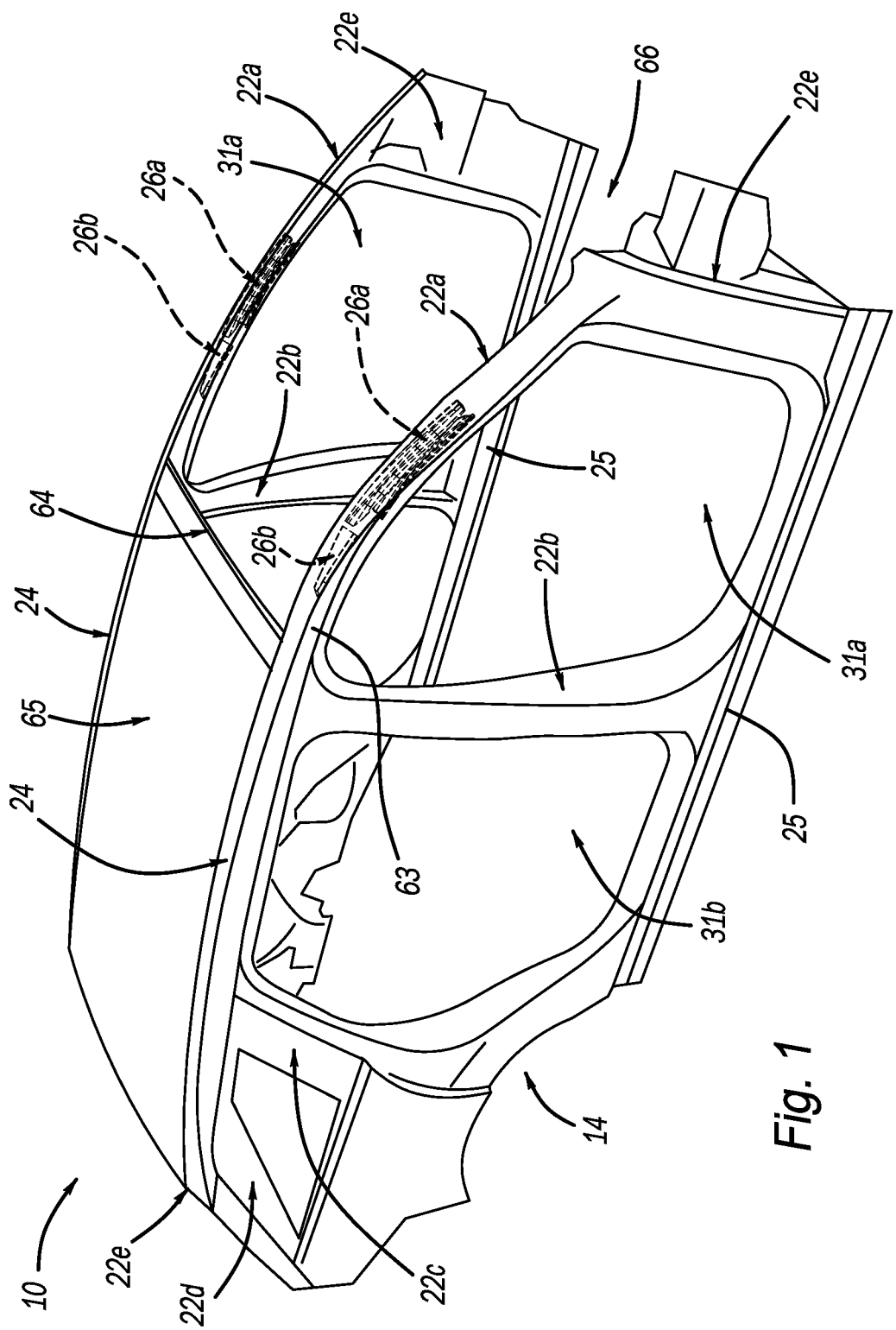
FIG. 1 is a perspective view of a vehicle body structure including reinforcement members according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is illustrated having a body structure 14. In some forms, the vehicle 10 can be an electric vehicle such as a battery electric vehicle (BEV), wherein drive wheels (not shown) are driven by electric motors (not shown) that receive power from a battery pack (not shown). In other examples, the vehicle 10 may be a hybrid electric vehicle (HEV), a plug-in electric vehicle (PHEV), an internal combustion engine powered vehicle, or a fuel cell vehicle, among others.

In the example illustrated, each side (i.e., left and right sides) of the vehicle body structure 14 includes a plurality of pillars (e.g., A-pillars 22a, B-pillars 22b, C-pillars 22c, D-pillars 22d and hinge pillars 22e), a roof side rail assembly 24, a rocker and a pair of reinforcement members 26a, 26b. The A-pillars 22a, the B-pillars 22b, the C-pillars 22c, the rockers 25 and the roof side rail assemblies 24 cooperate to define front door openings 31a in the vehicle body structure 14 on corresponding left and right sides of the vehicle 10. The B-pillars 22b, C-pillars 22c, the rockers 25, and the roof side rail assemblies 24a, 24b cooperate to define rear door openings 31b in the vehicle body structure 14 on corresponding left and right sides of the vehicle 10. Doors (not shown) are rotatably coupled to the vehicle body structure 14 (e.g., hinge pillars 22e or the B-pillars 22b) to be rotated between a closed position in which the doors are disposed within the door openings 31a or 31b and an open position in which the doors are removed from the door openings 31a or 31b. The vehicle body structure 14 can be a unibody vehicle architecture, though other configurations can be used, such as a body on frame vehicle architecture for example.

Figure 2:
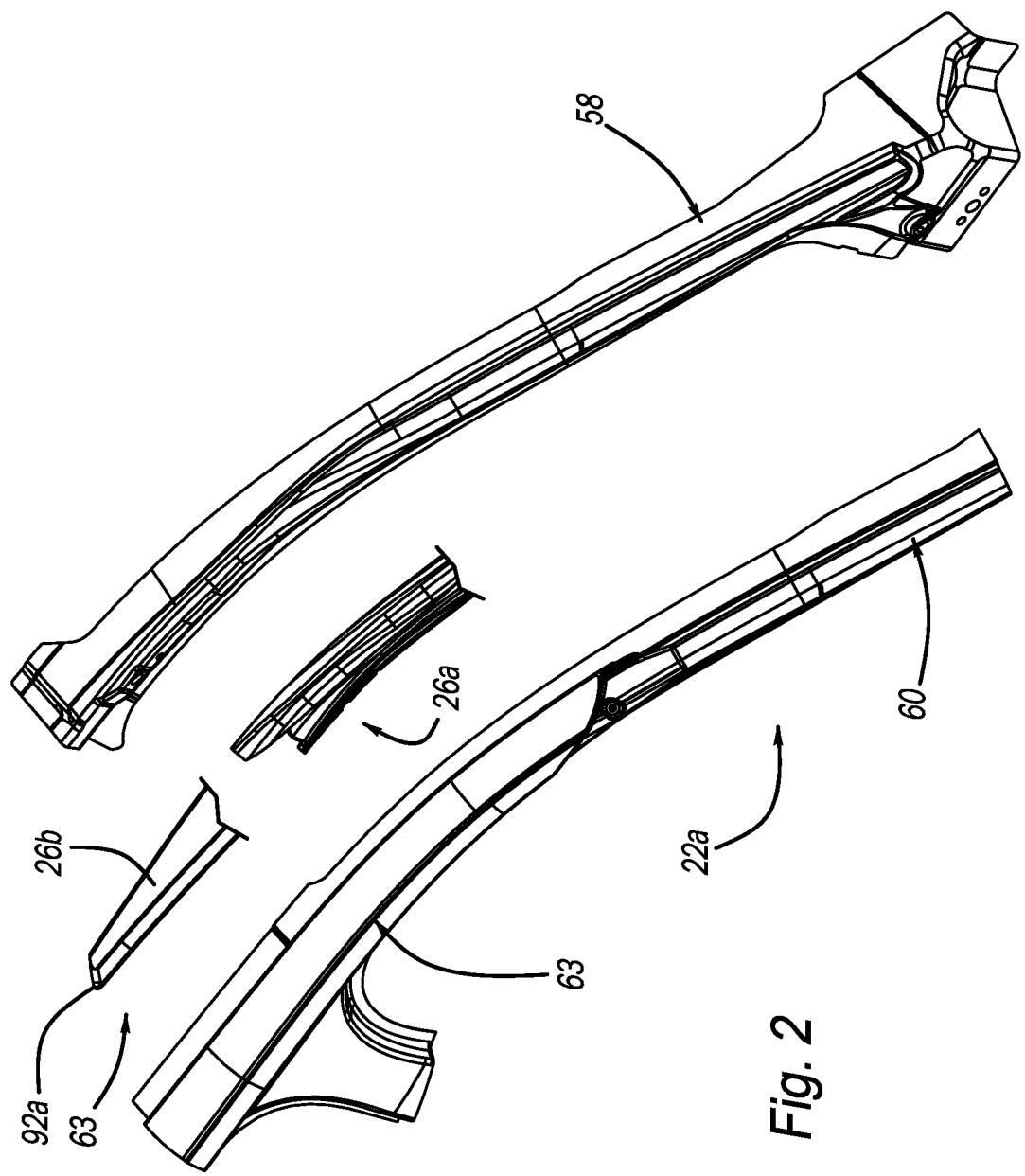
FIG. 2 is an exploded view of a vehicle pillar of the vehicle body structure of FIG. 1.
Figure 3:
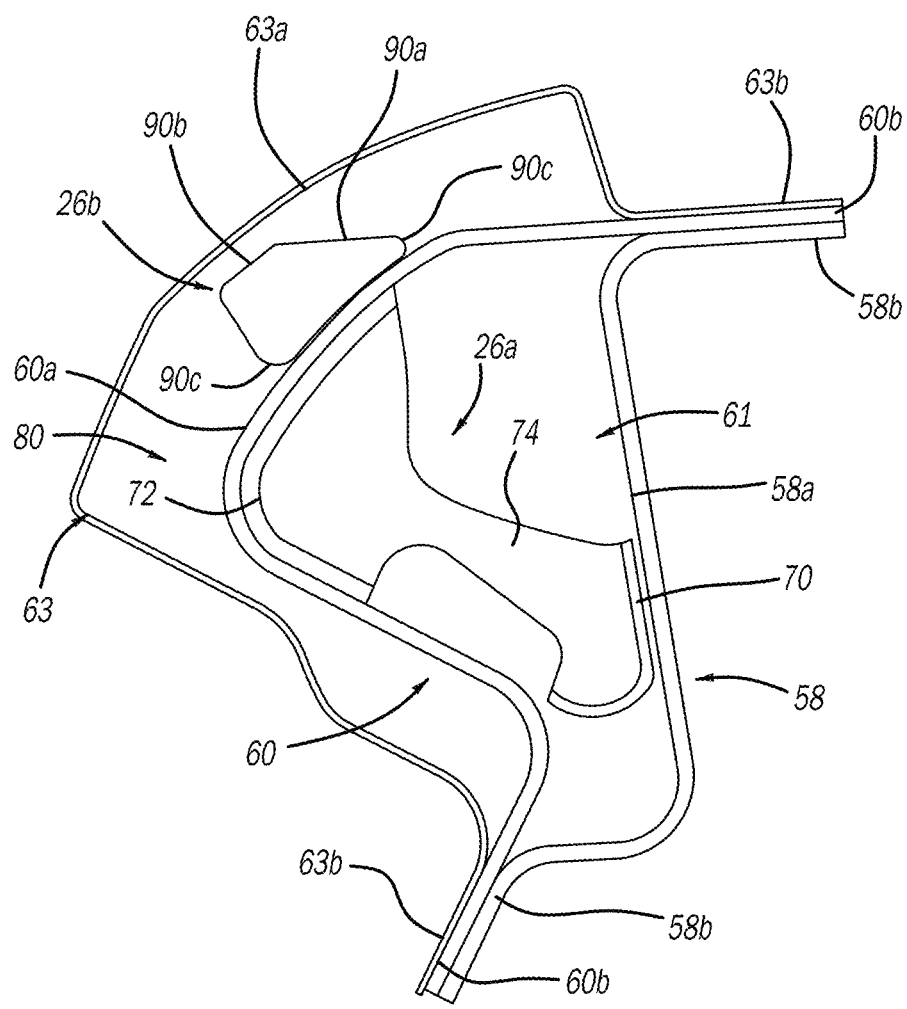
FIG. 3 is a cross-sectional view of the vehicle pillar of the vehicle body structure of FIG. 1.

Each A-pillar 22a extends from a front end of a respective roof side rail assembly 24 to a respective hinge pillar 22e. Referring to FIGS. 2 and 3, each A-pillar 22a includes an inner shell or panel 58 and an outer shell or panel 60 that are secured to each other to define an internal cavity 61 (FIG. 3). In the example illustrated, the inner shell 58 has a generally S-shaped cross-section and the outer shell 60 has a generally U-shaped cross-section. In some forms, the inner shell 58 and the outer shell 60 may include different shapes. The inner shell 58 includes a body 58a and a pair of flanges 58b and the outer shell 60 includes a body 60a and a pair of flanges 60b. The flanges 58b of the inner shell 58 are secured to the flanges 60b of the outer shell 60 (e.g., via mechanical fasteners, welding, adhesive, or any other suitable means).

The vehicle body structure 14 also includes a pair of U-shaped outer body members 63 (only one of which is labeled in the drawings). Each outer body member 63 is secured to the respective outer shell 60 of the A-pillar 22a, the respective roof side rail assembly 24 (FIG. 1) and/or a roof 65 (FIG. 1) of the vehicle 10 that spans laterally between the roof side rail assemblies 24. Each outer body member 63 extends in the longitudinal direction of the vehicle 10 and at least partially surrounds the respective outer shell 60.

In one form, each outer body member 63 and one or more pillar shells (e.g., inner shell 58, outer shell 60) are separate components that are secured to each other via mechanical fasteners, welding, adhesives or any other suitable attachment means. In some forms, each outer body member 63 and one or more pillar shells (e.g., inner shell 58, outer shell 60) form a single component. Each outer body member 63 has a material gauge that is less than a material gauge of the inner and outer shells 58, 60 of the A-pillar 22a. Each outer body member 63 includes a U-shaped body 63a and a pair of flanges 63b extending generally perpendicularly from the body 63a. The pair of flanges 63b are secured to the respective outer shell 60. Each outer body member 36 may optionally include one or more class A surfaces.

Referring back to FIG. 1, each B-pillar 22b extends downward from a respective roof side rail assembly 24 to a respective rocker 25. Each B-pillar 22b may extend from or near a middle portion of the respective roof side rail assembly 24 to or near a middle portion of the respective rocker 25. In the example illustrated, the vehicle body structure 14 includes one or more headers (not shown) and a roof bow 64. A rear header (not shown) of the plurality of headers is located at a rear of the vehicle 10 and extends in a transverse direction relative to a longitudinal direction of the vehicle 10. The rear header is also attached to the pair of roof side rail assemblies 24 at a location near the D-pillars 22d. In some forms, the rear header may be attached to the pair of roof side rail assemblies 24 at a location near the C-pillars 22c. The roof bow 64 is located further forward toward a front of the vehicle 10 compared to the rear header and extends in a transverse direction (e.g., side-to-side direction) of the vehicle 10, the transverse direction being transverse to a longitudinal direction (e.g., forward-rearward direction) of the vehicle 10. The roof bow 64 is also attached to the pair of roof side rail assemblies 24 and may be attached thereto at a location near the B-pillars 22b. In the example illustrated, the vehicle body structure 14 does not include a front header extending in the transverse direction of the vehicle 10 and attached to the pair of A-pillars 22a. In this way, a windshield (not shown) of the vehicle 10 may extend from a front end 66 of the vehicle 10 (e.g., near the hinge pillars 22e) to the roof bow 64 rearward of the A-pillars 22a, which provides occupants of the vehicle 10 with greater visibility compared to a vehicle where the windshield extends from the front end 66 to a front header near the A-pillars 22a. In some forms, the vehicle 10 includes a front header located further near a front of the vehicle 10 relative to the roof bow 64 and extending in the transverse direction of the vehicle 10.

The pair of roof side rail assemblies 24 are positioned at opposing sides of the vehicle 10 and extend along a longitudinal direction of the vehicle 10. Each of the roof side rail assemblies 24 include one or more structural members extending along a longitudinal direction of the vehicle 10.

With reference to FIGS. 2-5, the reinforcement members 26a, 26b are in the form of a single unitized, monolithic body that can be manufactured by an additive manufacturing process. In the example illustrated, the reinforcement members 26a, 26b are manufactured directly onto the A-pillars 22a. That is, each reinforcement member 26a, 26b is manufactured directly onto the A-pillar 22a using at least one additive manufacturing technique or process, such as, for example, directed energy deposition (DED), wire fed arc weld, powder-laser directed energy deposition, or cold spray, whereas the A-pillars 22a may be manufactured separately such as through traditional, non-additive manufacturing processes (e.g., stamping, forming, machining, forging, casting).

In a form where a DED process is used to manufacture the reinforcement member 26a, 26b, a nozzle may hold a material in a wire form, also referred to as a feed, which moves across multiple axes. An electron beam projector may melt the feed onto the A-pillar 22a as the electron beam projector moves across the A-pillars while tracing geometry of the reinforcement member 26a, 26b. In a form where the wire fed arc weld process is used to manufacture the reinforcement member 26a, 26b, an arc welding process is used to 3D print a metallic reinforcement member 26a, 26b onto the A-pillar 22a. In the wire fed arc weld process, a metal wire may be melted onto the A-pillar 22a using an electric arc as a heat source. In a form where the cold spraying additive manufacturing process is used to manufacture the reinforcement member 26a, 26b, fine powder particles are accelerated in a high velocity compressed gas stream, and upon the impact on a the A-pillar 22a or previous layers formed on the A-pillar 22a, deform and bond together creating a layer. Moving the nozzle over the A-pillar 22a repeatedly, a deposit is built layer-by-layer, to form the reinforcement member 26a, 26b on the A-pillar 22a. In a form where the powder-laser directed energy deposition process is used to manufacture the reinforcement member 26a, 26b, a laser beam may form a melt pool on a metallic substrate, into which powder is fed. The powder is subsequently melted to form a deposit that is fusion bonded to the substrate. In this form, the substrate can take the form of the A-pillar 22a and the powder may include stainless steel to form the reinforcement member 26a, 26b on the A-pillar 22a, though other materials may be used.

In some forms, the reinforcement members 26a, 26b may alternatively be manufactured separately using at least one additive manufacturing process, such as, for example, material extrusion, material jetting, powder bed fusion, DED and subsequently coupled to the A-pillar 22a using any suitable attachment method such as welding or mechanical fastening, for example.

In a form where DED for metal additive manufacturing process is used to manufacture the reinforcement member 26a, 26b, a material in a filament form can be drawn through a nozzle, heated, extruded and then deposited onto a build platform or directly onto a part in a layer-by-layer process. In a form where a material jetting process is used to manufacture the reinforcement member 26a, 26b, a material in the form of liquid droplets may be dispensed from multiple printheads. The material may include photosensitive polymer, which hardens on exposure to UV light to build the reinforcement member 26a, 26b layer-by-layer. In a form where a powder bed fusion process is used to manufacture the reinforcement member 26a, 26b, the process may use a laser or an electron beam to sinter, melt and fuse the powder particles together while tracing a cross-section of the reinforcement member 26a, 26b. On completion of a first layer, the powder dispensing unit may spread a new layer of powder onto the build platform and the printing may continue for subsequent layers, until the reinforcement member 26a, 26b is manufactured.

Figure 4:
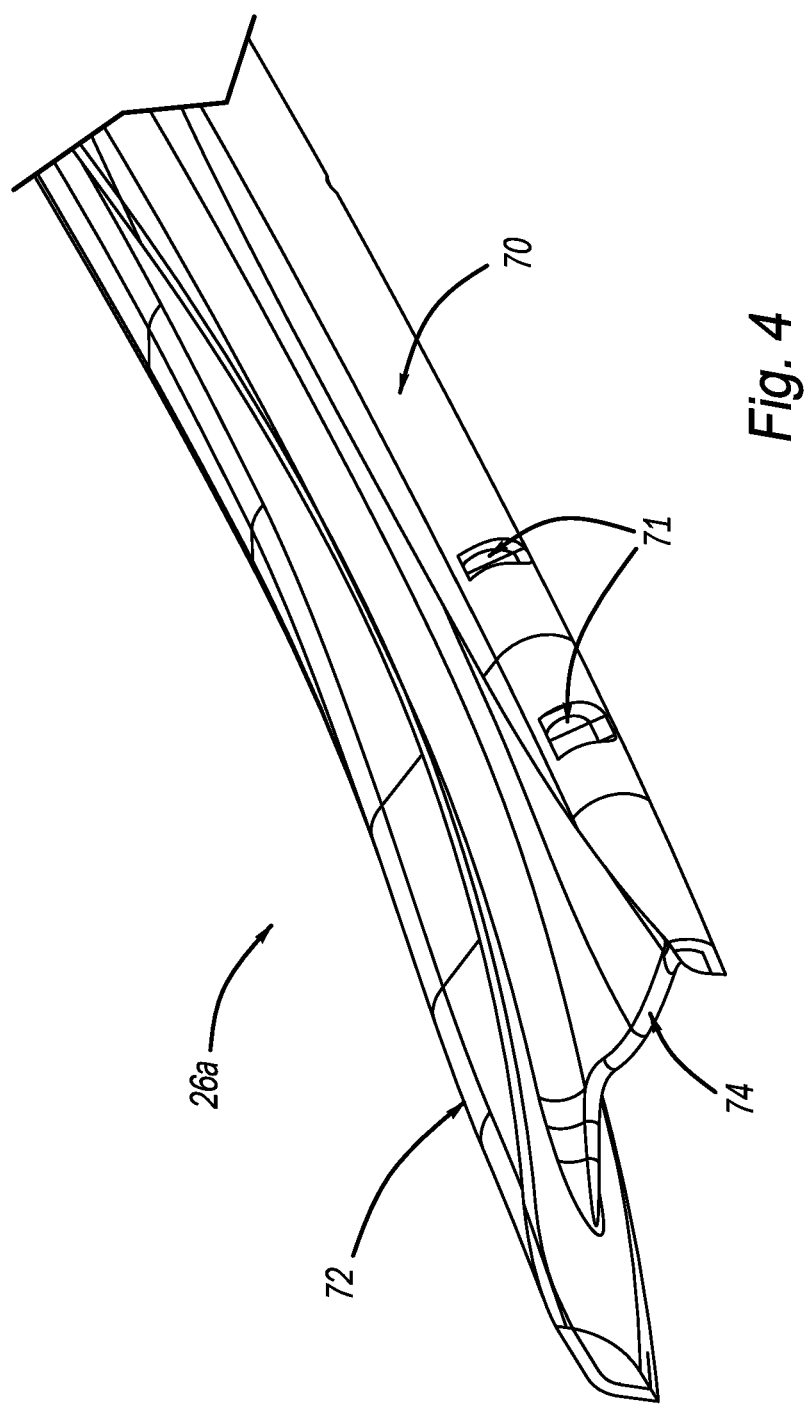
FIG. 4 is a perspective view of one reinforcement member of FIG. 1.

With reference to FIGS. 3 and 4, one or more reinforcement members 26a are disposed within the internal cavity 61 of a respective A-pillar 22a and extends along a longitudinal direction of the A-pillar 22a. In the example illustrated, the reinforcement member 26a extends substantially an entire length of the A-pillar 22a. In some forms, the reinforcement member 26a may extend less than half the entire length of the A-pillar 22a. In the example illustrated, the reinforcement member 26a is secured to the outer panel 60 of the A-pillar 22a and is spaced apart from the inner panel 58 of the A-pillar 22a. In some forms, the reinforcement member 26a may be secured to the outer panel 60 and the inner panel 58.

The reinforcement member 26a includes an inner panel portion 70, an outer panel portion 72, and a connecting portion 74 extending between and connecting the inner panel portion 70 and the outer panel portion 72. The inner panel portion 70 is located proximate the inner panel 58 of the A-pillar 22a and includes an outer profile that corresponds to a surface of the inner panel 58. In the example illustrated, the inner panel portion 70 is arcuate and has a solid structure. In some forms, the inner panel portion 70 is made of a lattice structure (not shown) formed of a plurality of struts. The inner panel portion 70 may also define one or more apertures 71 extending therethrough. The inner panel portion 70 may have a shape, thickness, and/or material that is different than that of the outer panel portion 72.

The outer panel portion 72 is located proximate the outer panel 60 of the A-pillar 22a and includes an outer profile that corresponds to a surface of the outer panel 60. In the example illustrated, the outer panel portion 72 is arcuate and has a solid structure. The outer panel portion 72 may also define one or more apertures (not shown) extending therethrough. In some forms, the outer panel portion 72 is made of a lattice structure (not shown) formed of a plurality of struts. The connecting portion 74 extends in the transverse direction of the vehicle 10 and is spaced apart from the inner panel 58 and the outer panel 60. In the example illustrated, the connecting portion 74 has a solid structure. In some forms, the connecting portion 74 is made of a lattice structure (not shown) formed of a plurality of struts. The connecting portion 74 may have a shape, thickness, and/or material that is different than that of the inner panel portion 70 and/or the outer panel portion 72.

Referring to FIG. 6C, a portion of an alternative form of a reinforcement member 126a is illustrated. The reinforcement member 126a can be similar to the reinforcement member 26a except as otherwise shown or described herein. Accordingly, similar features are shown with similar reference numerals and only differences are described in detail herein. The reinforcement member 126a is made of a solid structure and a portion of the reinforcement member 126a is made of a lattice structure (e.g., the inner and outer panels portions 70, 72 are made of a solid structure and the connecting portion 74 is made of a lattice structure).

Referring to FIGS. 6A and 6D, yet another alternative form of a reinforcement member 126b is illustrated. The reinforcement member 126b can be similar to the reinforcement member 26a or 126a except as otherwise shown or described herein. Accordingly, similar features are shown with similar reference numerals and only differences are described in detail herein. The reinforcement member 126b is made of a lattice structure formed by a plurality of interconnected struts 121 (i.e., the inner and outer panel portions 70, 72 and the connecting portion 74 are made of a lattice structure) extending in multiple directions relative to each other. In this way, the strength of the reinforcement member 126b is improved and the weight of the reinforcement member 26a is reduced.

Figure 5:
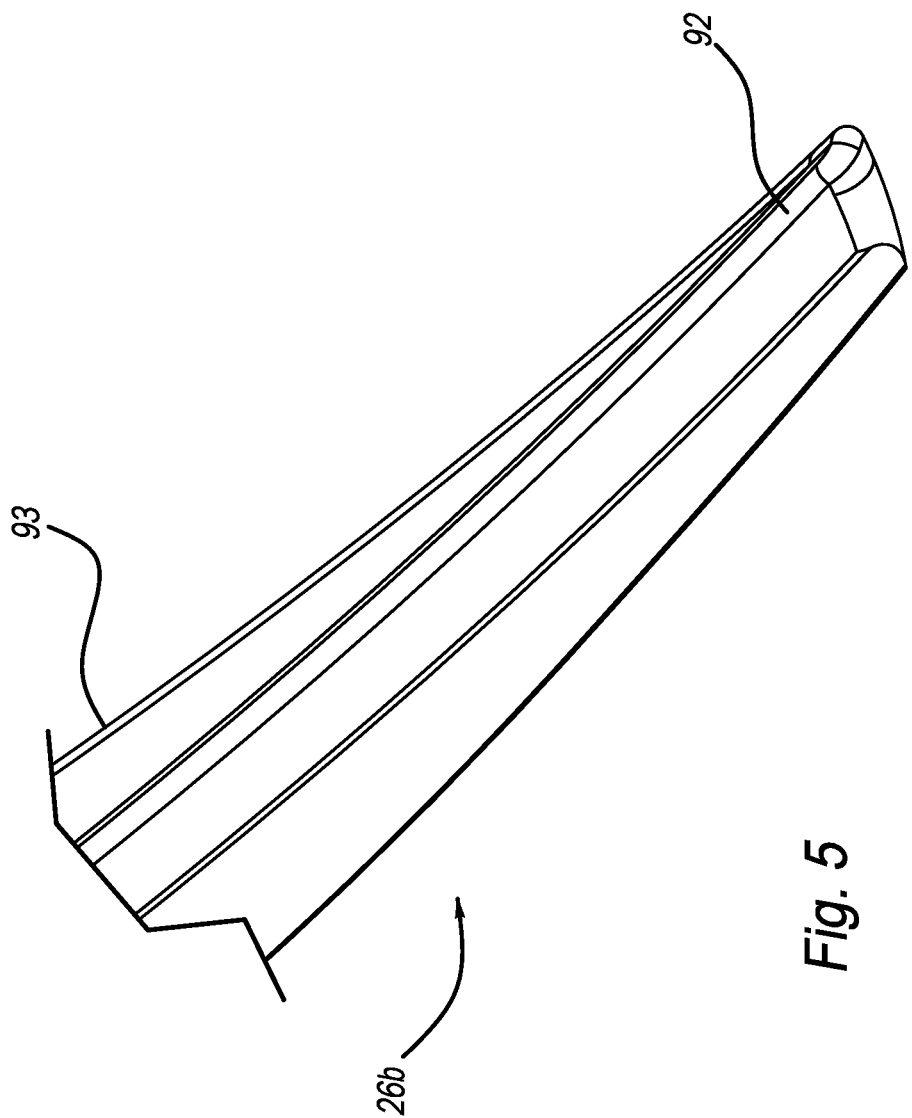
FIG. 5 is a perspective view of another reinforcement member of FIG. 1.

With reference to FIGS. 3 and 5, one or more reinforcement members 26b extend along a longitudinal direction of the A-pillar 22a and are fixed to and disposed outboard of the A-pillar 22a. Stated differently, the reinforcement member 26b is disposed within a cavity 80 formed by a respective outer panel 60 of the A-pillar 22a and a respective outer body member 63 such that the reinforcement member 26b is disposed between the respective outer body member 63 and the A-pillar 22a.

In the example illustrated, the reinforcement member 26b is fixed to the outer panel 60 and is spaced apart from the outer body member 63. In some forms, the reinforcement member 26b is fixed to the outer panel 60 and the outer body member 63. In the example illustrated, the reinforcement member 26b has a solid structure.

Referring to FIG. 6B, a reinforcement member 126c of yet another form is illustrated. The reinforcement member 126c can be similar to the reinforcement member 26b except as otherwise shown or described herein. Accordingly, similar features are shown with similar reference numerals and only differences are described in detail herein. The reinforcement member 126c is made of a lattice structure formed of a plurality of interconnected struts extending in multiple directions relative to each other. In this way, the strength of the reinforcement member 126c is improved and the weight of the reinforcement member 126c is reduced.

Referring to FIGS. 2, 3 and 5, in some forms, the reinforcement member 26b may extend substantially an entire length of the A-pillar 22a. In some forms, the reinforcement member 26b may extend less than half the entire length of the A-pillar 22a. The reinforcement member 26b may have a shape, thickness, and/or material that is different than that of the reinforcement member 26a, and has an outer profile that has a combination of sloped, flat, and/or arcuate surfaces 90a, 90b, 90c. In this way, the reinforcement member 26b is tuned to a desired stiffness and strength. A first end 93 of the reinforcement member 26b may be proximate the hinge pillar 22e and a second end 92 of the reinforcement member 26b may be proximate the roof side rail assembly 24. The second end 92a may have a smaller cross-sectional area than a cross-sectional area of the first end.

Although the reinforcement members 26a, 26b are shown in the figures associated with the A-pillar 22a, the reinforcement members 26a, 26b may be associated with other vehicle pillars (e.g., C-pillars 22c) while still remaining within the scope of the disclosure.

The reinforcement members 26a, 26b of the present disclosure being additively manufactured provides the benefit of allowing attachment structures to be added to the reinforcement members 26a, 26b. In this way, vehicle components such as fluid lines and/or wire bundles, for example, may be coupled to the reinforcement members 26a, 26b particularly in vehicles where there is no front header while also providing reinforcement of the vehicle pillars such as the A-pillars 22a. It should be understood that the reinforcement members 26a, 26b may be additively manufactured to include various shapes, materials, thicknesses and/or structures (e.g., lattice structures and solid structures).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle body structure comprising:
   a vehicle pillar comprising an inner panel and an outer panel secured to the inner panel to form an internal cavity; and
   a first unitized reinforcement member disposed within the internal cavity of the vehicle pillar and extending along a longitudinal direction of the vehicle pillar, the first unitized reinforcement member comprising an inner panel portion spaced apart from the inner panel, an outer panel portion coupled to an inner surface of the outer panel, and a connecting portion connecting the inner panel portion and the outer panel portion
   wherein a portion of the first unitized reinforcement member is made of a solid structure and another portion of the first unitized reinforcement member is made of a lattice structure.

2. The vehicle body structure of claim 1, wherein the inner panel includes a first body and a first pair of flanges extending from the first body and the outer panel includes a second body and a second pair of flanges extending from the second body and fixed to the first pair of flanges, the first unitized reinforcement member fixed to the second body.

3. The vehicle body structure of claim 2, wherein the another portion of the first unitized reinforcement member is the connecting portion.

4. The vehicle body structure of claim 1, wherein the vehicle pillar is an A-pillar.

5. The vehicle body structure of claim 1, wherein the inner panel portion, the outer panel portion, and the connecting portion comprise the lattice structure.

6. The vehicle body structure of claim 1, further comprising a second unitized reinforcement member fixed to and disposed outboard of the vehicle pillar.

7. The vehicle body structure of claim 6, wherein the second unitized reinforcement member extends along a longitudinal direction of the vehicle pillar.

8. The vehicle body structure of claim 6, wherein the second unitized reinforcement member comprises a lattice structure.

9. The vehicle body structure of claim 6, further comprising a body outer member secured to the outer panel of the vehicle pillar, the second unitized reinforcement member being disposed between the body outer member and the vehicle pillar.

10. The vehicle body structure of claim 9, wherein the second unitized reinforcement member is spaced apart from the body outer member.

11. The vehicle body structure of claim 1, further comprising:
    a hinge pillar; and
    a B-pillar connected to the hinge pillar by the vehicle pillar,
    wherein the first unitized reinforcement member is located closer towards the B-pillar than the hinge pillar.

12. A vehicle body structure comprising:
a vehicle pillar comprising an inner panel and an outer panel secured to the inner panel to form an internal cavity; and
a plurality of unitized reinforcement members secured to the vehicle pillar and extending along a longitudinal direction of the vehicle pillar, a first unitized reinforcement member of the plurality of unitized reinforcement members is disposed within the internal cavity and a second unitized reinforcement member of the plurality of unitized reinforcement members is disposed outboard of the vehicle pillar,
wherein each of the first and second unitized reinforcement members comprises a portion having a lattice structure, and
wherein another portion of the first unitized reinforcement member is made of a solid structure.

13. The vehicle body structure of claim 12, wherein the first unitized reinforcement member comprises an inner panel portion located proximate the inner panel, an outer panel portion located proximate the outer panel, and a connecting portion connecting the inner panel portion and the outer panel portion, the connecting portion comprising the lattice structure.

14. The vehicle body structure of claim 12, wherein the inner panel includes a first body and a first pair of flanges extending from the first body and the outer panel includes a second body and a second pair of flanges extending from the second body and fixed to the first pair of flanges, the first unitized reinforcement member fixed to the second body.

15. The vehicle body structure of claim 12, further comprising a body outer member secured to the outer panel of the vehicle pillar, the second unitized reinforcement member being disposed between the body outer member and the vehicle pillar.

16. The vehicle body structure of claim 15, wherein the first unitized reinforcement member is spaced apart from the inner panel and the second unitized reinforcement member is spaced apart from the body outer member.

17. A method comprising:
directly depositing a material onto a vehicle pillar using additive-manufacturing to build local reinforcement members onto the vehicle pillar, each reinforcement member comprising an inner panel portion located proximate an inner panel of the vehicle pillar, an outer panel portion located proximate an outer panel of the vehicle pillar, and a connecting portion connecting the inner panel portion and the outer panel portion,
wherein a portion of a first reinforcement member of the reinforcement members is made of a solid structure and another portion of the first reinforcement member of the reinforcement members is made of a lattice structure.

18. The method of claim 17, wherein the vehicle pillar is an A-pillar.

19. The method of claim 17, wherein the first reinforcement member of the reinforcement members is located within an internal cavity of the vehicle pillar and a second reinforcement member of the reinforcement members is located external to the internal cavity of the vehicle pillar.

20. The vehicle body structure of claim 1, wherein the portion of the first unitized reinforcement member is the inner panel portion.

* * * * *